(12) United States Patent
Choi et al.

(10) Patent No.: US 12,306,097 B2
(45) Date of Patent: May 20, 2025

(54) RESIDUAL STRESS ESTIMATION APPARATUS AND METHOD

(71) Applicants: Hyundai Motor Company, Seoul (KR); Kia Corporation, Seoul (KR); INDUSTRIAL COOPERATION FOUNDATION JEONBUK NATIONAL UNIVERSITY, Jeonju-si (KR)

(72) Inventors: Eun Jeong Choi, Seongnam-si (KR); Keum Hyang Lee, Hwaseong-si (KR); Min Chul Shin, Seoul (KR); Chan Ho Jeong, Hwaseong-si (KR); Lae Hyong Kang, Jeonju-si (KR); Hye Lim Jang, Iksan-si (KR); Dae Hyun Han, Gunsan-si (KR)

(73) Assignees: Hyundai Motor Company, Seoul (KR); Kia Corporation, Seoul (KR); Industrial Cooperation Foundation Jeonbuk National University, Jeonju-si (KR)

( * ) Notice: Subject to any disclaimer, the term of this patent is extended or adjusted under 35 U.S.C. 154(b) by 273 days.

(21) Appl. No.: 18/075,160

(22) Filed: Dec. 5, 2022

(65) Prior Publication Data
US 2024/0011902 A1 Jan. 11, 2024

(30) Foreign Application Priority Data
Jul. 5, 2022 (KR) .......................... 10-2022-0082347

(51) Int. Cl.
*G01N 21/88* (2006.01)
*G01N 21/3563* (2014.01)
*G01N 21/3586* (2014.01)
*G02B 5/30* (2006.01)

(52) U.S. Cl.
CPC ..... *G01N 21/3586* (2013.01); *G01N 21/3563* (2013.01); *G02B 5/30* (2013.01)

(58) Field of Classification Search
None
See application file for complete search history.

(56) References Cited

U.S. PATENT DOCUMENTS

| | | | |
|---|---|---|---|
| 9,574,933 B2 | 2/2017 | Kondo et al. | |
| 2022/0026372 A1* | 1/2022 | Federici | G01M 3/38 |
| 2024/0011902 A1* | 1/2024 | Choi | G01L 1/241 |

FOREIGN PATENT DOCUMENTS

| | | | |
|---|---|---|---|
| JP | 2016014552 A | | 1/2016 |
| JP | 2020026992 A | * | 2/2020 |
| JP | 2020197505 A | | 12/2020 |
| JP | 6843397 B2 | | 3/2021 |
| KR | 101424840 B1 | | 8/2014 |
| KR | 101958305 B1 | | 7/2019 |
| KR | 102353547 B1 | | 1/2022 |

* cited by examiner

*Primary Examiner* — Marcus H Taningco
(74) *Attorney, Agent, or Firm* — Fish & Richardson P.C.

(57) ABSTRACT

An apparatus performs a method for estimating residual stress of a material such as plastics. The apparatus includes an inspection unit configured to emit a terahertz wave to a subject to be inspected and to detect the terahertz wave transmitted through or reflected from the subject, and a controller configured to estimate residual stress of the subject based on the terahertz wave detected by the inspection unit.

18 Claims, 8 Drawing Sheets

RESIDUAL STRESS ESTIMATION APPARATUS AND METHOD

CROSS-REFERENCE TO RELATED APPLICATION

This application claims, under 35 U.S.C. § 119(a), the benefit of and priority from Korean Patent Application No. 10-2022-0082347 filed on Jul. 5, 2022, the entire contents of which are incorporated herein by reference.

TECHNICAL FIELD

The present disclosure relates to an apparatus and method for estimating residual stress of a material. More particularly, it relates to an apparatus and method for estimating residual stress present in plastics.

BACKGROUND

As a high molecular compound, plastics can be easily processed into a desired shape by applying heat and pressure. A typical molding method is an injection process. Due to these strengths, plastics are widely used in various industries. For example, in the automobile industry, application thereof has been expanded to not only vehicle interior materials but also to major parts of a vehicle body to reduce curb weight.

A plastic molded article can be processed through solidification or hardening by injecting a high-temperature resin into a mold. Specifically, a plastic molded article is manufactured by injecting a high-temperature resin into a mold at high speed and high pressure and withdrawing a hardened plastic from the mold.

However, during such an injection molding process, residual stress may be generated in the plastic molded article due to non-uniformity of a cooling temperature, etc. Residual stress refers to stress that remains after physical stimulus is removed from an object. The residual stress may be generated in the molded article when a high-temperature resin is cooled under an abnormal condition. When the residual stress is present in the molded article, the residual stress may cause a decrease in intensity and deformation or even cracks or destruction in severe cases.

Therefore, in order to ensure quality of plastic molded articles, technology for evaluating and estimating residual stress is necessary.

SUMMARY OF THE DISCLOSURE

The present disclosure has been made in an effort to solve the above-described problems associated with prior art.

An object of the present disclosure is to provide a residual stress estimation apparatus and method capable of estimating residual stress of a plastic molded article.

The object of the present disclosure is not limited to the object mentioned above, and other objects not mentioned herein may be clearly understood by those of ordinary skill in the art to which the present disclosure belongs (hereinafter referred to as "person of ordinary skill") from the description below.

Features of the present disclosure for achieving the object of the present disclosure described above and performing characteristic functions of the present disclosure to be described later are as follows.

In one aspect, the present disclosure provides an apparatus for estimating residual stress including an inspection unit configured to emit a terahertz wave to a subject to be inspected and to detect the terahertz wave transmitted through or reflected from the subject, and a controller configured to estimate residual stress of the subject based on the terahertz wave detected by the inspection unit.

In another aspect, the present disclosure provides a method of estimating residual stress including emitting, by a generator, a terahertz wave to a subject, detecting, by a detector, the terahertz wave transmitted through or reflected from the subject, and estimating, by a controller, the residual stress of the subject based on the electrical signal converted from emitted terahertz wave and the detected signal of transmitted or reflected terahertz wave from the subject.

Other aspects and example implementations of the disclosure are discussed infra.

The above and other features of the disclosure are discussed infra.

BRIEF DESCRIPTION OF THE DRAWINGS

The above and other features of the present disclosure will now be described in detail with reference to certain exemplary implementations thereof illustrated in the accompanying drawings which are given herein below by way of illustration only, and thus are not limitative of the present disclosure.

DETAILED DESCRIPTION

Figure 1:
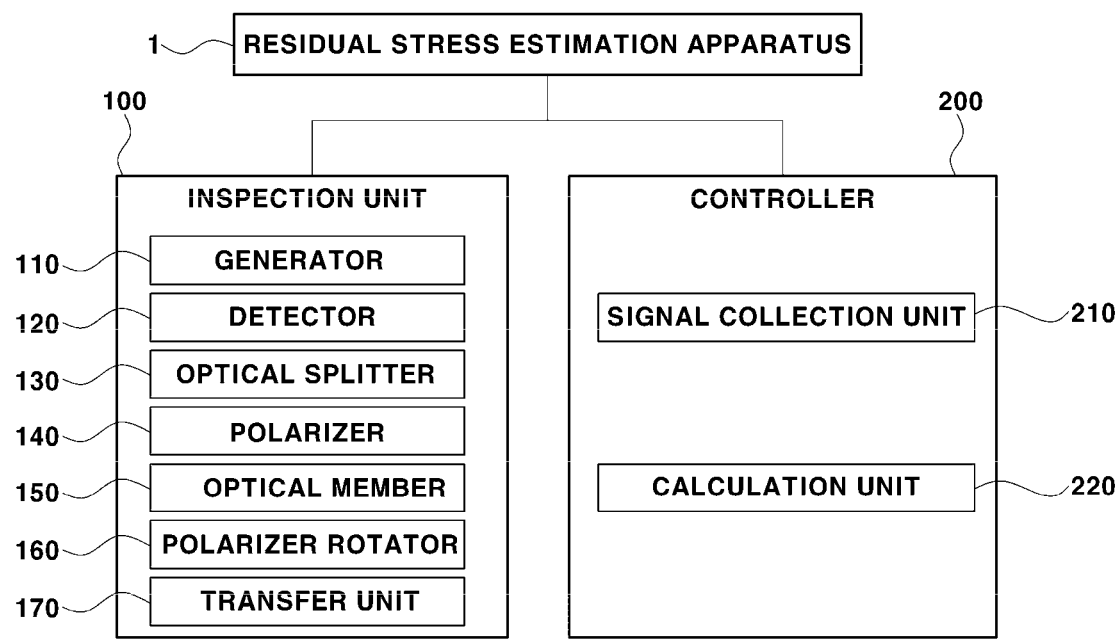
FIG. 1 illustrates an example of a residual stress estimation apparatus.

Specific structural or functional descriptions presented in the implementations of the present disclosure are only illustrative for the purpose of describing implementations according to the concept of the present disclosure, and the implementations according to the concept of the present disclosure may be implemented in various forms. In addition, the present disclosure should not be construed as being limited to the implementations described herein, and should be understood to include all modifications, equivalents, and substitutes included in the spirit and scope of the present disclosure.

Hereinafter, the present disclosure will be described in detail with reference to the accompanying drawings.

Residual stress of plastic is inspected using various methods. For instance, a non-destructive inspection method may be used without damaging an inspection subject. In a non-destructive and non-contact inspection method, residual stress is inspected by transmitting arbitrary waves, such as X-rays, non-linear ultrasonic waves, and light waves through the inspection subject and analyzing waves obtained by transmission. In addition, in case of transparent plastic, a photoelastic method using a light source is used.

However, there are limitations in currently used inspection technology. For example, when X-rays are used, there is a risk of exposure of inspection personnel to radiation. In order to evaluate residual stress, the amount of change after halogen, light waves, etc., pass through the inspection subject needs to be measured. However, in some cases, it may be difficult to measure residual stress since the light source may not penetrate an opaque material.

Accordingly, the present disclosure provides a residual stress estimation apparatus capable of measuring residual stress of not only transparent plastic but also opaque plastic with high reliability. In particular, the present disclosure proposes a residual stress estimation apparatus using terahertz waves.

A terahertz wave is an electromagnetic wave having a frequency of 0.1 to 10 terahertz located between infrared and radio waves in the electromagnetic spectrum.

Terahertz waves have several properties that can be advantageous for measuring residual stress. First, unlike X-rays, terahertz waves do not ionize. Therefore, there is little risk of damaging biological tissues or deoxyribonucleic acid (DNA) so that biological stability can be ensured. Secondly, terahertz waves have a property of well penetrating non-electrode materials, such as ceramics, plastics, and semiconductors, which rarely transmit visible light and near-infrared rays. In addition, terahertz waves have optical properties, and thus it is easy to use an existing optical component, and decrease in a signal strength and a phase change are considerable depending on the component of the transmitted material. Finally, a femtosecond pulse laser generating a terahertz wave may generate a terahertz wave having relatively large strength in a wide range of frequency since strength of light is large.

In some implementations, as illustrated in FIG. 1, a residual stress estimation apparatus 1 includes an inspection unit 100 and a controller 200. The inspection unit 100 is configured to perform measurement for estimating residual stress, and the controller 200 is configured to estimate residual stress of the inspection subject by calculating and analyzing a measurement result by the inspection unit 100.

For example, the inspection unit 100 will be briefly described as follows. A generator 110 of the inspection unit 100 is configured to generate a terahertz wave. A detector 120 may detect intensity of a terahertz wave passing through a subject S to be inspected. An optical splitter 130 may configure a movement path of the generated terahertz wave. In addition, a polarizer 140 is configured to be able to control a propagation direction of the terahertz wave. In an optical member 150, a singlet lens, etc., may be appropriately disposed in the inspection unit 100 for focusing, etc. A polarizer rotator 160 is configured to rotate the polarizer 140 provided in the inspection unit 100. A transfer unit 170 enables the subject S to move.

The controller 200 may include a signal collection unit 210 and a calculation unit 220. The signal collection unit 210 collects a signal detected by the detector 120, and the calculation unit 220 is configured to analyze the collected signal to estimate residual stress of the subject S.

Figure 2A:
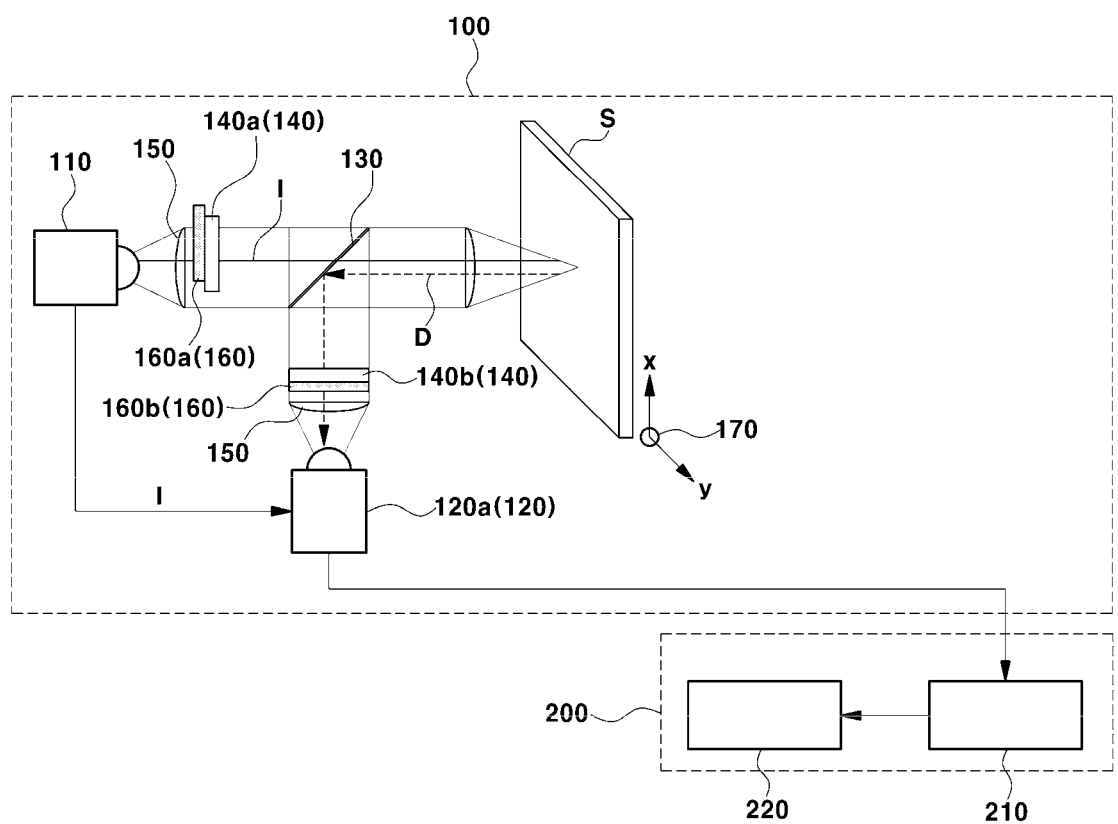
FIGS. 2A to 2C illustrate the residual stress estimation apparatus.

FIG. 2A illustrates the residual stress estimation apparatus 1. In some implementations, the residual stress estimation apparatus is configured to estimate residual stress based on a terahertz wave reflected from the subject S.

The generator 110 is configured to generate a terahertz wave and emit the terahertz wave to the subject S, which is a measurement subject of residual stress. In particular, the generator 110 may be configured to emit a pulsed terahertz wave.

In addition, a detector 120*a* receives a terahertz wave I emitted from the generator 110. Further, the detector 120*a* is configured to detect a terahertz wave D reflected from the subject S.

The optical splitter 130 forms a movement path of the terahertz wave so that the optical splitter 130 operates in a transmission or reflection mode. Specifically, the optical splitter 130 is configured to pass the terahertz wave I emitted from the generator 110 so that the terahertz wave I can be incident on the subject S and to guide the terahertz wave D reflected from the subject S to the detector 120*a*.

Polarizers 140*a* and 140*b* may be provided to the generator 110 and the detector 120*a*, respectively. The polarizers 140*a* and 140*b* are configured to adjust a propagation direction of the terahertz wave by 360° so that a direction of residual stress in the subject S can be estimated (see FIG. 4). In an implementation, the polarizer 140*a* of the generator 110 and the polarizer 140*b* of the detector 120*a* are disposed to be orthogonal to each other.

Polarization is a phenomenon in which an electric field or a magnetic field included in an electromagnetic wave vibrates in a specific direction when the electromagnetic wave propagates. In a state in which the polarizers 140*a* and 140*b* are orthogonal to each other, a propagation direction of the terahertz wave and a direction of the polarizer 140*b* of the detector 120*a* become different from each other, and thus the detector may not be passed through. However, a signal difference occurs in the terahertz wave passing through a specimen having a changed internal state depending on the state of residual stress, and even when the polarizers 140*a* and 140*b* are orthogonal to each other, the terahertz wave can pass through the detector due to an influence of the residual stress. In the present disclosure, a model for estimating the magnitude and direction of residual stress using polarization characteristics of terahertz waves has been established.

In addition, the generator 110 and the detector 120*a* further include polarizer rotators 160*a* and 160*b*, respectively. The polarizer rotator 160 is configured to rotate each of the polarizer 140*a* of the generator 110 and the polarizer 140*b* of the detector 120*a*. The polarizer rotator 160*a* of the generator 110 and the polarizer rotator 160*b* of the detector 120*a* allow the polarizers 140*a* and 140*b* to rotate simultaneously in an orthogonal state (see FIG. 3).

Figure 5:
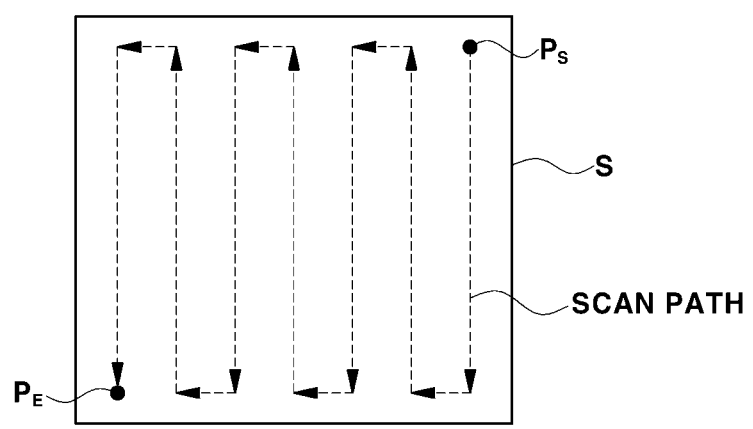
FIG. 5 illustrates an example scan path of the residual stress estimation apparatus.

When residual stress exists in the subject S, an internal state of the subject S changes, which causes a difference in terahertz waves detected according to polarization characteristics. In some implementations, a direction of the residual stress can be estimated based on such a signal difference. Specifically, in a state in which the polarizer 140*a* of the generator 110 and the polarizer 140*b* of the detector 120*a* are disposed to be orthogonal to each other, the detector 120*a* is allowed to detect a reflected terahertz wave. Then the detector 120*a* is allowed to continuously detect the reflected terahertz wave while rotating each of the polarizer rotators 160*a* and 160*b* so that the polarizer 140*a* and the polarizer 140*b* rotate from 0° to 180° while maintaining the orthogonal state. The amplitude or intensity of the terahertz wave detected at every increment of angle from 0° to 180° has the largest value in a direction in which residual stress exists, that is, in a main stress direction, due to polarization characteristics of the terahertz wave. Therefore, a direction of the residual stress in the subject S may be estimated in this process. The transfer unit 170 may transfer the subject S in a planar direction, that is, in an x-axis direction and a y-axis direction. As illustrated in FIG. 5, while the subject S is moved using the transfer unit 170, two-dimensional area scan and inspection can be performed along a scan path from a start point $P_S$ to an end point $P_E$ for an inspection site desired by a user.

Referring to FIG. 2A again, the controller 200 is configured to analyze the detected terahertz wave and estimate residual stress. Specifically, the controller 200 is configured to compare the terahertz wave I directly received by the detector 120a from the generator 110 with the terahertz wave D reflected from the subject S and detected by the detector 120a. The controller 200 may estimate residual stress based on the intensities and a time delay of the terahertz wave I emitted to the inspection subject and the detected terahertz wave D.

The signal collection unit 210 of the controller 200 is configured to collect both the terahertz wave I emitted to the inspection subject and the reflected terahertz wave D. In addition, the terahertz waves I, D collected by the signal collection unit 210 are transmitted to the calculation unit 220. The calculation unit 220 is configured to calculate the residual stress of the subject S by comparing the terahertz wave I emitted to the inspection subject and the reflected terahertz wave D, which are collected.

As described above, the polarizer rotators 160a and 160 are rotated in a predetermined step from 0° to 180°. At this time, the signal collection unit 210 of the controller 200 collects maximum intensity of the terahertz wave for each terahertz wave detected for each angle. By comparing the terahertz wave I emitted to the inspection subject with the reflected terahertz wave D collected by the signal collection unit 210, the calculation unit 220 calculates a time delay at which the maximum intensity of the terahertz wave is located. Using the calculated time delay, the controller 200 may estimate the residual stress of the subject S.

A refractive index ns of the detected terahertz wave may be determined from Equation 1.

$$n_s = \frac{\Delta t}{2} \times \frac{c}{T_s} \quad \text{[Equation 1]}$$

Here, $\Delta t$ denotes a time delay, c denotes the speed of light in a vacuum, and Ts denotes a thickness of the subject S.

The refractive index ns is proportional to the time delay $\Delta t$, and the refractive index ns is proportional to the amount of residual stress. Therefore, the controller 200 may estimate the residual stress of the subject S by using the maximum intensity and a time delay of the detected terahertz wave.

Figure 6:
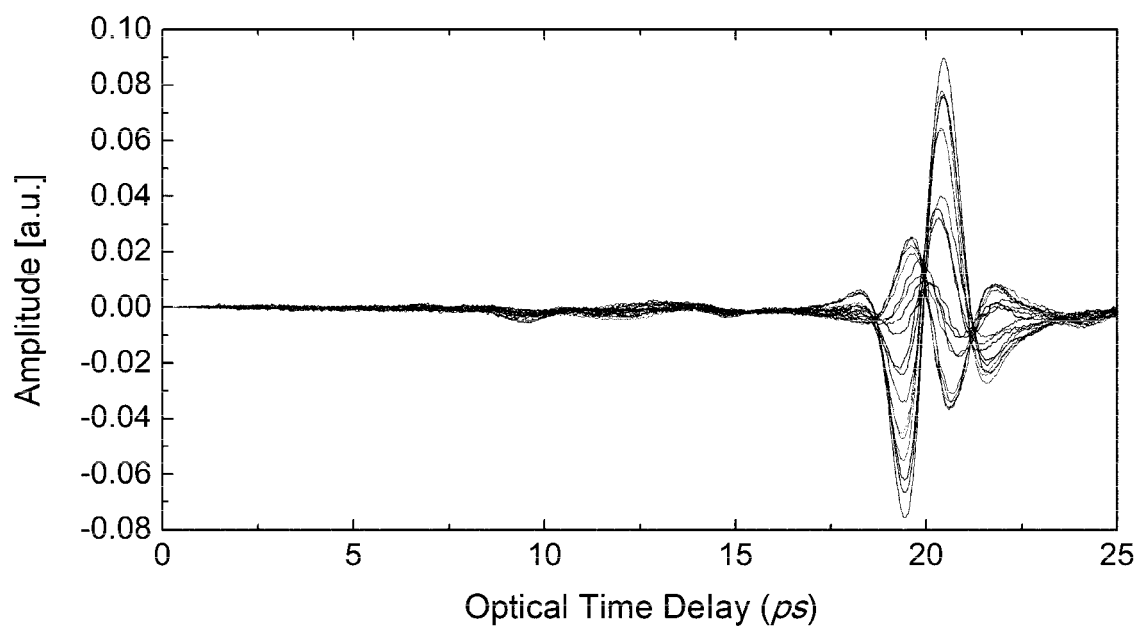
FIG. 6 illustrates detected data detected by the residual stress estimation apparatus.

Illustratively, as illustrated in FIG. 6, a set of detected terahertz waves detected for each certain increment of an angle from 0° to 180° may be acquired. In the set of detected terahertz waves, each terahertz wave is acquired at a specific angle. As a non-limiting example, each graph is detected at 0°, 10°, 20°, . . . , 180°. In this case, the certain increment of the angle is 10°. As for the maximum intensity, it can be seen that the time delay $\Delta t$ is located between 20 picoseconds and 22.5 picoseconds, and it can be determined that residual stress is present therefrom. The magnitude of the residual stress may be determined based on Equation 1 using the time delay $\Delta t$ at the corresponding maximum intensity. The direction of the residual stress may be determined as a rotation angle value that is a propagation direction of the detected terahertz wave having the corresponding maximum intensity. In this case, the detected terahertz wave is a signal observed when the polarizer 140a of the generator 110 and the polarizer 140b of the detector 120a are rotated by 120°.

Figure 2B:
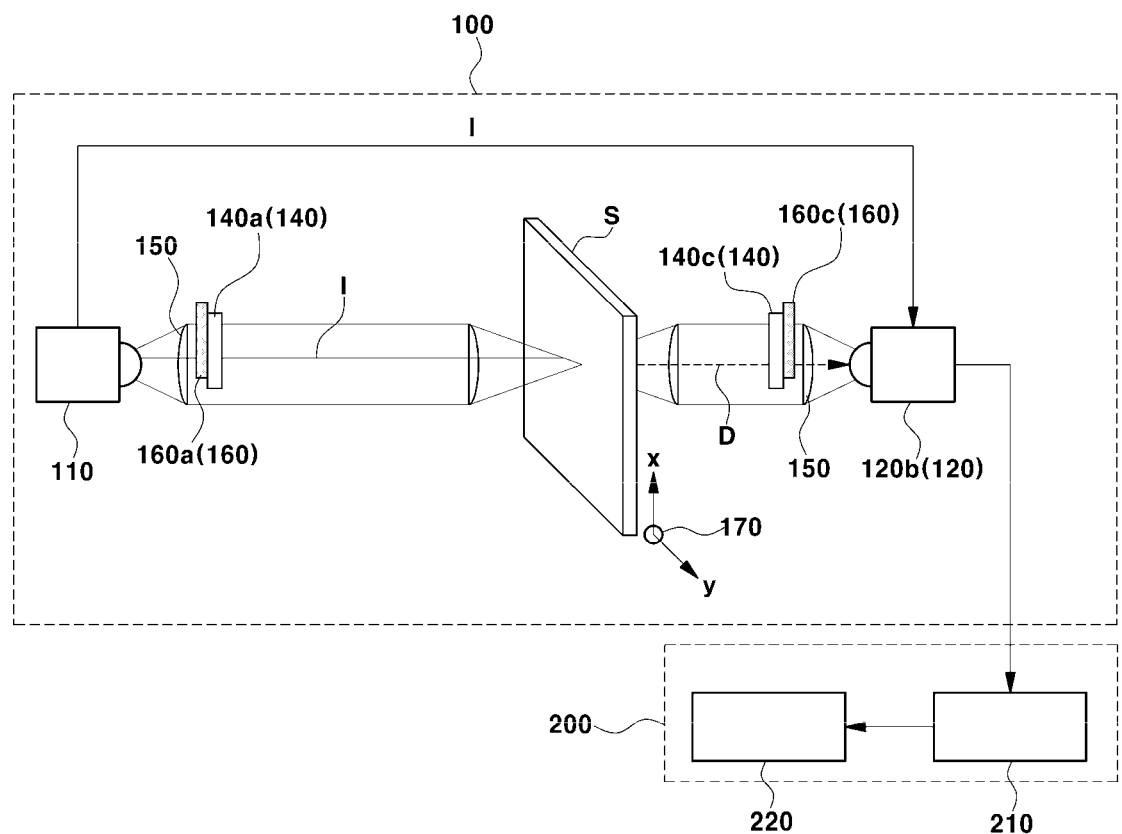

FIG. 2B illustrates the residual stress estimation apparatus 1. In some implementations, the residual stress of the subject S is estimated using a terahertz wave passing through the subject S. Hereinafter, content overlapping with the implementation of FIG. 2A may be partially omitted, and in some implementations, the optical splitter 130 may be included or omitted.

The generator 110 generates the terahertz wave I, and the terahertz wave I is emitted to the subject S.

A detector 120b is configured to directly receive the terahertz wave I generated from the generator 110 and receive the terahertz wave D transmitted through the subject S at the same time.

Polarizers 140a and 140c may be provided to the generator 110 and the detector 120b, respectively. The polarizers 140a and 140c are configured to adjust a propagation direction of the terahertz wave by 360° so that the direction of the residual stress in the subject S can be estimated. In an implementation, the polarizer 140a of the generator 110 and the polarizer 140c of the detector 120b are disposed to be orthogonal to each other.

The generator 110 and the detector 120b further include polarizer rotators 160a, 160c, respectively. The polarizer rotators 160a, 160c are configured to rotate the polarizer 140a of the generator 110 and the polarizer 140c of the detector 120b, respectively. The polarizer rotator 160a of the generator 110 and the polarizer rotator 160c of the detector 120b allow the polarizers 140a, 140c to rotate in an orthogonal state.

In some implementations, the transfer unit 170 is provided to allow the subject S to move in the x-axis direction or the y-axis direction.

In addition, the controller 200 is configured to compare the terahertz wave I detected by the detector 120b with the transmitted terahertz wave D. The signal collection unit 210 collects both the emitted terahertz wave I and the transmitted terahertz wave D and transmits the collected terahertz waves I and D to the calculation unit 220. The calculation unit 220 is configured to calculate the residual stress based on the intensities and the time delay of the collected terahertz waves I and D.

Figure 2C:
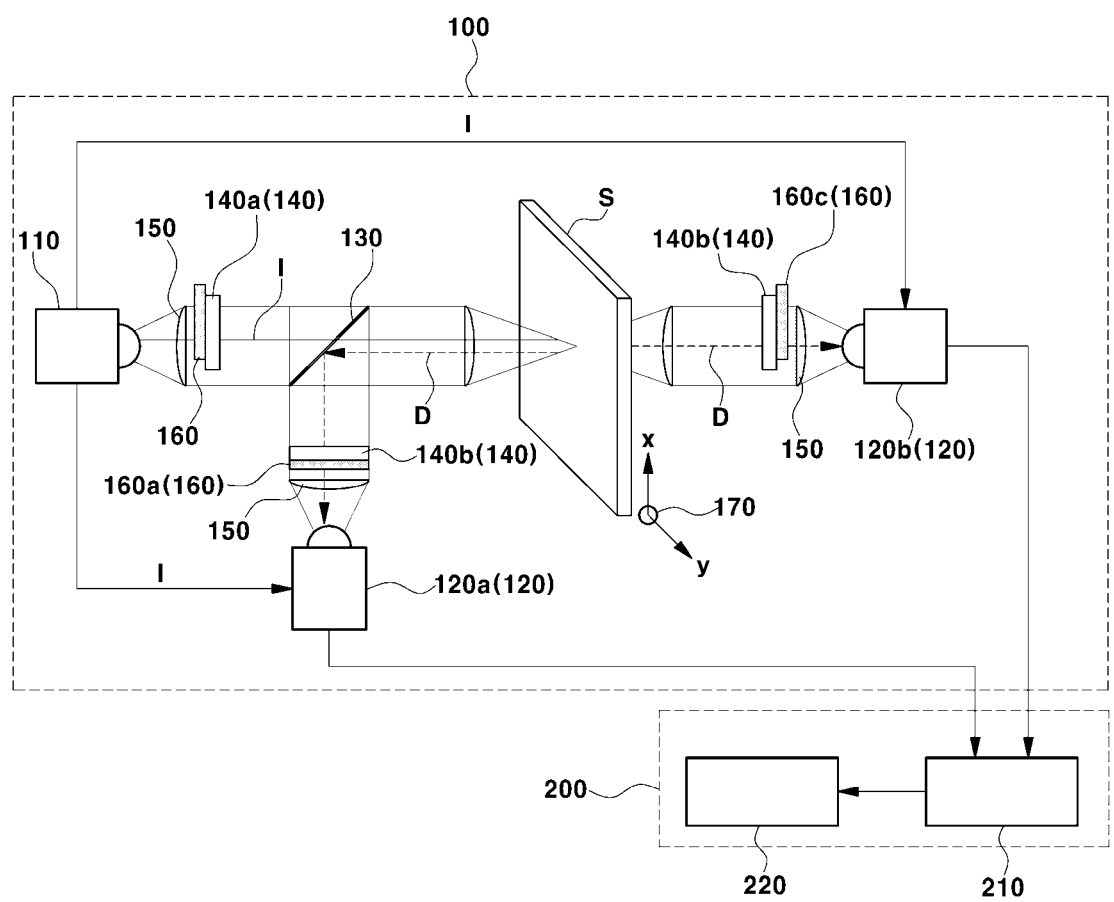

FIG. 2C illustrates some implementations of the present disclosure in which a detection method of the reflected wave of FIG. 2A and a detection method of the transmitted wave of FIG. 2B are combined. Since the content described above in the implementations of FIGS. 2A and 2B can be applied without change, a redundant description will be omitted.

Figure 7:
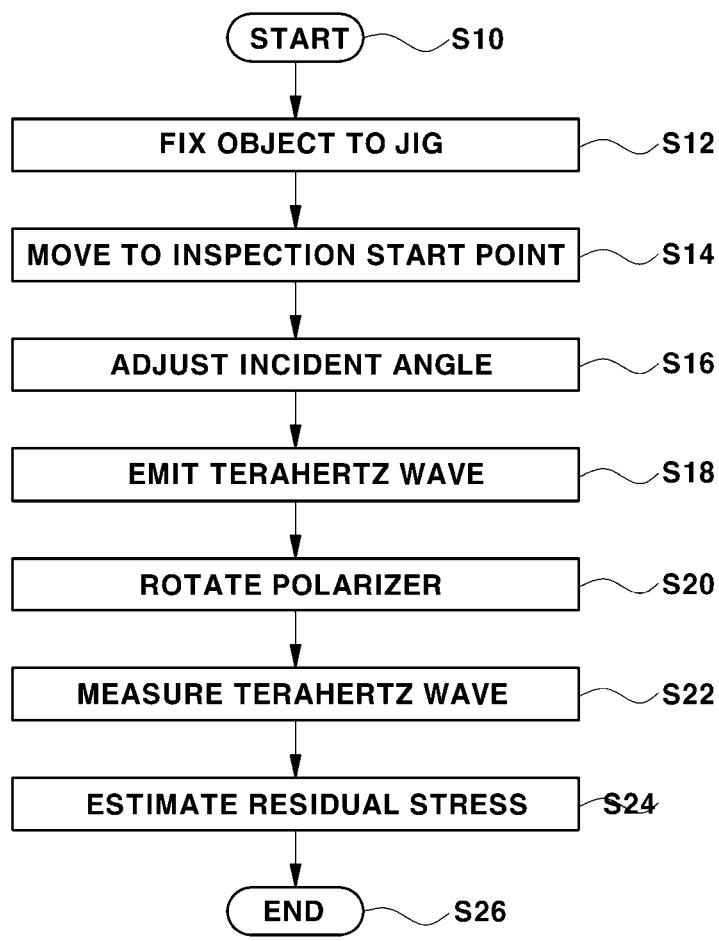
FIG. 7 illustrates a flowchart of an example of a residual stress estimation method.

With additional reference to FIG. 7, an operation of the residual stress estimation apparatus may be performed as follows.

Figure 3:
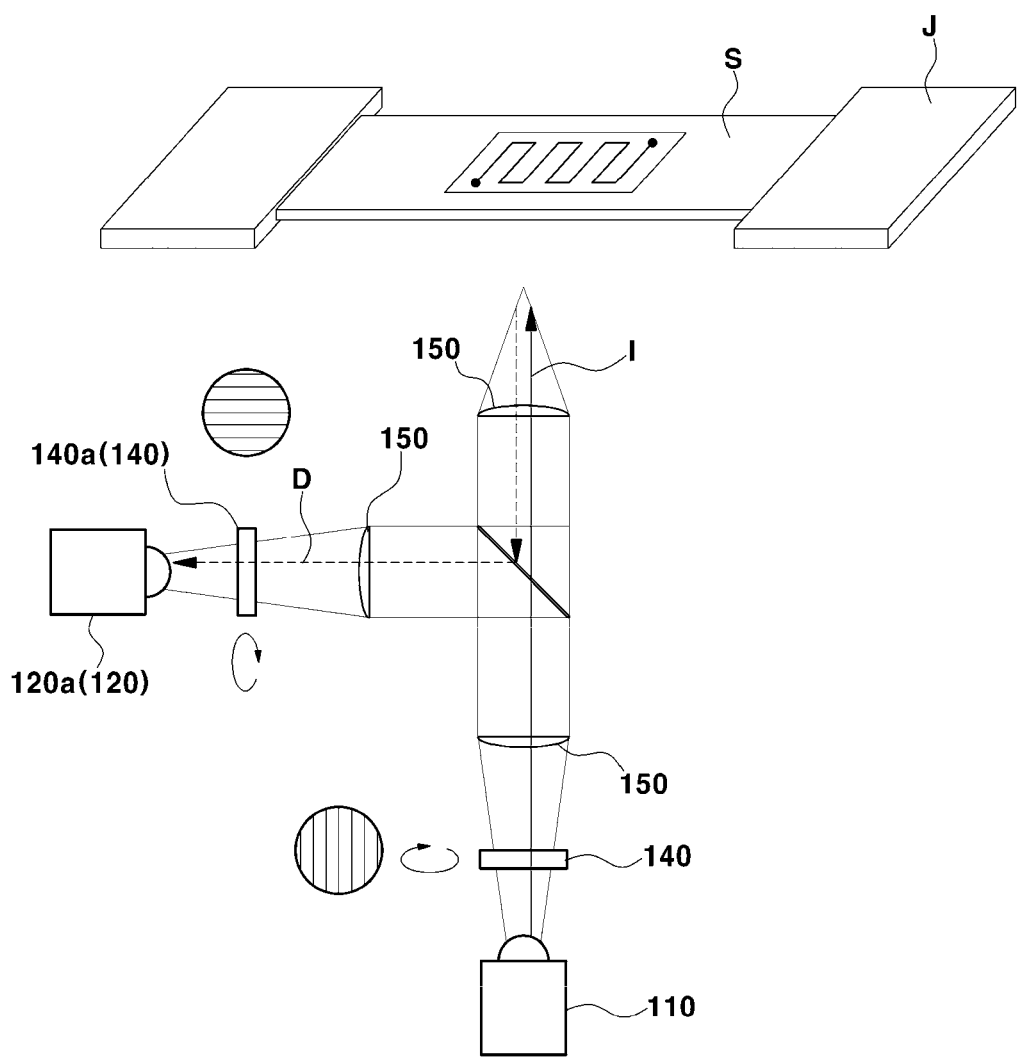
FIG. 3 illustrates a partial configuration of the residual stress estimation apparatus.

At S10, measurement of the residual stress of the subject S by the residual stress estimation apparatus 1 is started. As illustrated in FIG. 3, first, the subject S is fixed to a jig J (S12). The jig J may be configured to be moved by the transfer unit 170 while the subject S is mounted.

Referring to FIG. 5 again, the generator 110 may be positioned at the start point $P_S$ of the scan by operating the transfer unit 170 so that the subject S can be inspected along a preset scan path (S14).

As illustrated in FIG. 3, angles of the generator 110, the angle between the optical splitter 130, and/or the subject S are adjusted so that the terahertz wave I is vertically incident on the subject S (S16).

At S18, a pulsed terahertz wave is emitted from the generator 110. The emitted terahertz wave I is directly input to the detectors 120a, 120b, transmitted through and/or reflected by the subject S to be inspected at the same time, and then input to each detector 120.

Figure 4:
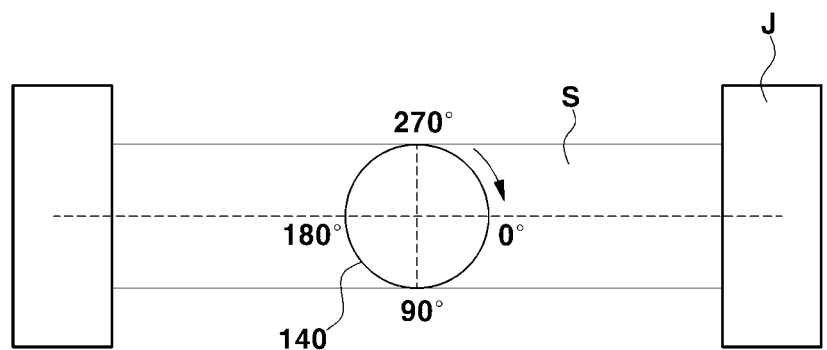
FIG. 4 illustrates an operation of an example of a polarizer of the residual stress estimation apparatus.

Measurements are taken while each polarizer 140 is rotated by the polarizer rotator 160 at each point on the scan path (S20). The polarizer 140*a* of the generator 110 and the polarizer 140*b* of the detector 120*a*, or the polarizer 140*a* of the generator 110 and the polarizer 140*c* of the detector 120*b* start to rotate in an orthogonal state and may be rotated from 0° to 180° while maintaining the orthogonal state. In an implementation, as illustrated in FIG. 4, the polarizer 140 may be configured to rotate clockwise with respect to the subject S.

While the polarizer 140 is rotated, the terahertz wave I emitted to the inspection subject and the reflected terahertz wave D are continuously measured by the detector 120 (S22).

The controller 200 receives the terahertz wave detected by the detector 120 and estimates the residual stress by analyzing the terahertz wave (S24). Specifically, the controller 200 may compare the intensities and time delay of the terahertz wave I emitted to the subject S and the reflected terahertz wave D to estimate the magnitude of the residual stress of the subject S, and estimate the direction of the residual stress based on the maximum intensity detected through rotation of the polarizer 140. In addition, by operating the transfer unit 170 in advance, an inspection site desired by an inspector may be inspected along a preset path of the subject S.

Then, at S26, the measurement process ends.

The residual stress estimation apparatus enables estimation of residual stress of not only a transparent material but also opaque plastic.

The residual stress estimation apparatus may be used at any stage of the process. In particular, a reflection detection method enables measurement from the outside, and thus the residual stress estimation apparatus may be widely used in a production process, inspection of a finished product, etc.

The residual stress estimation apparatus is based on a non-contact and non-destructive method, and thus may not deform or damage the inspection subject.

The present disclosure provides a residual stress estimation apparatus and method capable of estimating residual stress of a plastic molded article.

Effects of the present disclosure are not limited to those described above, and other effects not mentioned herein will be clearly recognized by those skilled in the art from the above description.

The present disclosure described above is not limited by the above-described implementations and the accompanying drawings, and it will be apparent to those of ordinary skill in the art to which the present disclosure pertains that various substitutions, modifications, and changes are possible without departing from the technical idea of the present disclosure.

What is claimed is:

1. An apparatus for estimating residual stress, comprising:
   an inspection unit comprising:
      a generator configured to generate and emit a first terahertz wave to a subject to be inspected,
      a detector configured to receive the first terahertz wave emitted from the generator and to detect a second terahertz wave that is transmitted through or reflected from the subject,
      a first polarizer disposed downstream relative to the generator in a first propagation direction of the first terahertz wave, and
      a second polarizer disposed upstream relative to the detector in a second propagation direction of the second terahertz wave; and
   a controller configured to estimate the residual stress of the subject based on the first terahertz wave and the second terahertz wave,
   wherein the inspection unit is configured to:
      rotate the first polarizer and the second polarizer, and
      detect a set of terahertz waves detected based on rotating the first polarizer and the second polarizer by an increment of an angle within an angular range while maintaining the first polarizer and the second polarizer to be orthogonal to each other.

2. The apparatus of claim 1, wherein the first polarizer and the second polarizer are disposed orthogonal to each other.

3. The apparatus of claim 2, wherein the generator and the detector comprise polarizer rotators configured to rotate the first polarizer and the second polarizer, respectively.

4. The apparatus of claim 1, further comprising an optical splitter disposed downstream relative to the first polarizer in the first propagation direction of the first terahertz wave, the optical splitter being configured to guide the first terahertz wave.

5. The apparatus of claim 4, wherein:
   the detector comprises a first detector configured to detect the second terahertz wave reflected from the subject; and
   the optical splitter is configured to direct the reflected second terahertz wave to the first detector.

6. The apparatus of claim 1, wherein the first terahertz wave is incident perpendicularly to a surface of the subject.

7. The apparatus of claim 1, further comprising a transfer unit configured to movably mount the subject in a plane, the plane being perpendicular to an incident direction of the first terahertz wave.

8. The apparatus of claim 1, wherein the subject comprises a plastic material that is at least partially transparent or opaque.

9. The apparatus of claim 1, wherein the first terahertz wave comprises one or more pulses.

10. The apparatus of claim 1, wherein the controller is configured to estimate the residual stress of the subject based on (i) intensities of the first terahertz wave and the second terahertz wave reflected from the subject and (ii) a time delay between the first terahertz wave and the second terahertz wave reflected from the subject.

11. A method for estimating residual stress, the method comprising:
   emitting, by a generator, a first terahertz wave to a subject;
   detecting, by a detector, a second terahertz wave that is transmitted through or reflected from the subject based on the first terahertz wave being incident to the subject; and
   estimating, by a controller, the residual stress of the subject based on the first terahertz wave and the second terahertz wave,
   wherein detecting the second terahertz wave comprises:
      rotating a first polarizer and a second polarizer, and
      detecting a set of terahertz waves detected based on rotating the first polarizer and the second polarizer by an increment of an angle within an angular range while maintaining the first polarizer and the second polarizer to be orthogonal to each other.

12. The method of claim 11,
   wherein the first polarizer is disposed downstream relative to the generator in a first propagation direction of the first terahertz wave emitted from the generator, and the second polarizer is disposed upstream relative to the detector in a second propagation direction of the second terahertz wave that is transmitted through or reflected from the subject.

13. The method of claim 12, wherein estimating the residual stress comprises:
   determining, by the controller, a maximum intensity among the detected set of terahertz waves; and
   estimating, by the controller, a direction of the residual stress based on the maximum intensity.

14. The method of claim 12, wherein estimating the residual stress comprises:
   determining, by the controller, a maximum intensity in the detected set of terahertz waves;
   calculating, by the controller, a time delay between the first terahertz wave and a terahertz wave having the maximum intensity among the detected set of terahertz waves; and
   estimating, by the controller, a magnitude of the residual stress based on the calculated time delay.

15. The method of claim 12, wherein rotating the first polarizer and the second polarizer comprises rotating the first polarizer and the second polarizer by 0° to 180° clockwise.

16. The method of claim 11, wherein emitting the first terahertz wave comprises:
   emitting the first terahertz wave to the subject that is movably mounted on a transfer unit in a plane, the plane being perpendicular to an incident direction of the first terahertz wave.

17. The method of claim 16, further comprising operating the transfer unit to thereby align a preset measurement point defined on the subject with the generator.

18. The method of claim 17, further comprising:
   repeating emitting the first terahertz wave and detecting the second terahertz wave while moving the subject along a path from the preset measurement point by operating the transfer unit.

\* \* \* \* \*